Feb. 26, 1924.
G. B. LEAR
OIL BURNER
Filed Nov. 1, 1922
1,484,993
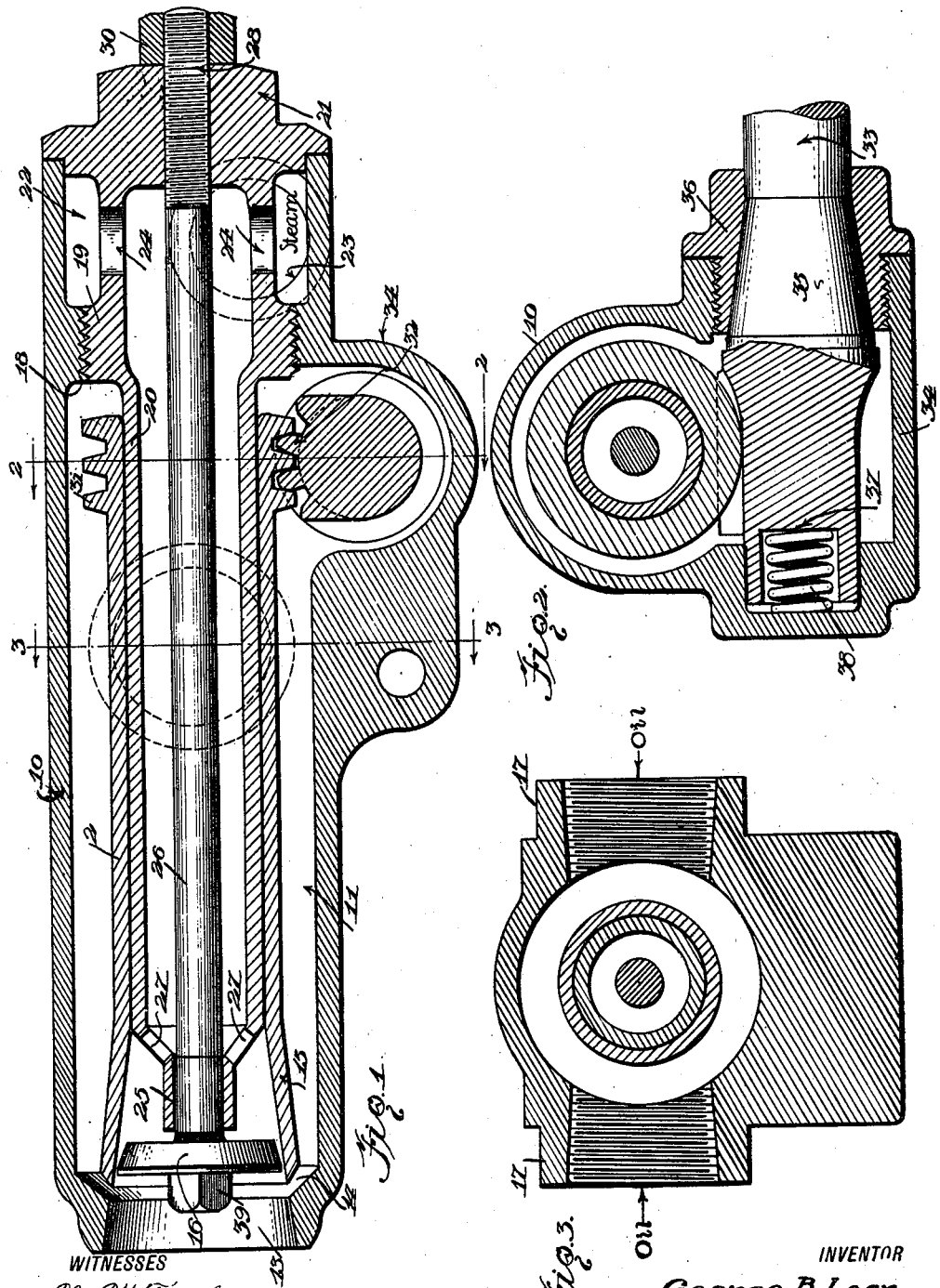
WITNESSES
INVENTOR
George B. Lear
BY
ATTORNEYS Patented Feb. 26, 1924.

1,484,993

UNITED STATES PATENT OFFICE.

GEORGE BAUMAN LEAR, OF SHREVEPORT, LOUISIANA.

OIL BURNER.

Application filed November 1, 1922. Serial No. 598,450.

*To all whom it may concern:*

Be it known that I, GEORGE B. LEAR, a citizen of the United States, and a resident of Shreveport, in the parish of Caddo and State of Louisiana, have invented certain new and useful Improvements in Oil Burners, of which the following is a specification.

My present invention relates to oil burners, and particularly to burners for the utilization of heavy oil in connection with steam, my primary objects being the provision of a burner of this type by means of which simultaneous and highly effective regulation of the steam and oil may be obtained, in which highly effective atomization of the oil is accomplished, in which the danger of clogging is minimized and quick and easy relief from clogging is provided for, as well as one in which the parts are readily accessible for various purposes.

In the accompanying drawing which illustrates my present invention and forms a part of this specification, Figure 1 is a central longitudinal section through my improved burner, Figure 2 is a vertical cross section taken on line 2—2 of Figure 1, and Figure 3 is a similar view taken on line 3—3 of Figure 1.

Referring now to these figures and particularly to Figure 1 my improved burner includes a cylindrical casing 10 within the main bore 11 of which a regulating tube 12 is axially shiftable, the forward end of the casing 10 being reduced and having an atomized fuel outlet 13 toward and away from the internal shoulder 14 of which the forward slightly flared outlet end 15 of the regulating tube 12 is movable to form between these parts an annular channel through which oil within the casing may flow into the path of steam jetting through the forward outlet end of the regulating tube around a spreader 16.

The burner as a whole may be adjustably supported by virtue of diametrically opposed laterally outstanding trunnions 17 of the casing 10 intermediate the ends of the latter, which trunnions as particularly shown in Figure 3 are bored for the passage of oil into the main bore 11 of casing 10, and are preferably internally threaded to receive the threaded ends of oil supply pipes (not shown).

At a point spaced from its rear end and at the rear end of its main bore 11, the casing 10 has an internal threaded rib 18, with which the externally threaded annular outstanding rib 19 of the steam tube 20 cooperates to position and hold the steam tube axially within the casing. This steam tube, or the major portion thereof forwardly of the rib 19 presents a support for the regulating tube 12, which the latter engages with a close sliding fit, and the rear end of the steam tube has an enlarged head 21 adapted to abut the rear end of the casing 10 in steam-tight relation so that a steam chamber 22 is thus formed between the head 21 and the threaded engaging ribs 18 and 19, within the rear portion of the casing 10. With this steam chamber 22 a steam inlet 23 of the casing communicates, steam from the chamber 22 passing into the rear portion of the steam tube 20 through openings 24 of the latter.

At its forward end the steam tube 20 has a reduced cylindrical bearing 25 for the forward portion of the stem 26 of the spreader 16 and adjacent to this bearing 25, the steam tube 20 has steam outlet apertures 27 which open into the flared forward portion 15 of the regulating tube 12.

The stem 26 of the spreader 16 passes axially through the steam tube 20 as shown and its rear portion is threaded as at 28 for adjustable extension through a threaded conformable bore axially of the enlarged rear head 21 of the steam tube, the spreader 16 having a forwardly projecting adjusting nut 29 rigid with the same and with the stem 26 so that the latter may be turned through the head 21 to adjust the spreader 16 toward or away from the outlet opening 13 of the casing 10. The rear end of the stem 26 extends beyond the head 21 to receive a lock nut 30.

At its rear end the regulating tube 12 has spaced annular ribs 31 engaged by teeth 32 lengthwise of an adjusting shaft 33 shown particularly in Figure 2. This adjusting shaft is mounted at right angles to the longitudinal axis of the burner, within a laterally enlarged and extended portion 34 of the burner casing 10, and has a conical portion 35 which seats in the conical bore of a plug 36, the latter threaded into one side of the enlarged portion 34 of the casing. At its inner end, the shaft 33 has an axial recess 37 which houses a spring 38, the latter bearing against one wall of the enlarged casing portion 34 so as to shift the adjusting shaft in the direction of its length and maintain the conical portion thereof in steam-tight engagement with the conical portion of the plug 36, removal of the latter of which permits of ready removal of the adjusting shaft itself.

In operation oil flows inwardly through the bored trunnions 17 to the main bore 11 of the casing and through the latter to the oil outlet channel between the shoulder 14 at the forward end of the casing and the forward end of the adjusting tube 12, and it is obvious that the oil is there taken up and thoroughly atomized by virtue of the steam jet around the spreader 16, steam being taken into the rear end of the steam tube 20 and passing into the flared forward end of the regulating tube 12 through the steam tube openings 27.

It is furthermore obvious that upon adjusting movement of the regulating tube 12, which may be controlled from a distant point by suitable connections with the adjusting shaft 33, the oil and steam are simultaneously regulated, the proportion of steam being capable of independent control by the adjustment of the spreader 16 as previously described.

It is also obvious that by this arrangement not only very effective atomization is promoted and efficient regulation provided for, but clogging is prevented in most instances and even should the burner clog, the ready accessibility of its parts, for instance the ready removal of the steam tube by unscrewing, enables cleaning out without disturbing pipe joints or parts of a like nature.

I claim:

1. A burner including a cylindrical casing having a steam inlet and having a main bore and an oil inlet opening into said bore, said casing having a reduced outlet at one end, a steam tube detachably mounted axially of and within the casing and closing its opposite end, said tube having a steam receiving aperture in communication with the steam inlet of the casing and having its opposite end in fixedly spaced relation to the outlet end of the casing, a regulating sleeve slidably mounted on the steam tube within the main bore of the casing and having one flared end into which the steam tube discharges, movable toward and away from the reduced discharge end of the casing, means for shifting said regulating tube, and a spreader within the flared end of the regulating tube.

2. A burner including a cylindrical casing having a steam inlet and having a main bore and an oil inlet opening into said bore, said casing having a reduced outlet at one end, a steam tube detachably mounted axially of and within the casing and closing its opposite end, said tube having a steam receiving aperture in communication with the steam inlet of the casing and having its opposite end in fixedly spaced relation to the outlet end of the casing, a regulating sleeve slidably mounted on the steam tube within the main bore of the casing and having one flared end into which the steam tube discharges, movable toward and away from the reduced discharge end of the casing, means for shifting said regulating tube, and a spreader within the flared end of the regulating tube, said spreader being adjustably connected to and supported by the said steam tube and said shifting means for the regulating tube extending exteriorly of the casing.

3. A burner including a cylindrical casing having a reduced outlet at one end and having an oil inlet, a steam tube axially within the casing having a steam outlet at one end spaced from the outlet of the casing, a regulating tube adjustable on the steam tube, having one flared end shiftable between the outlet end of said steam tube and the reduced outlet of the casing, means for shifting said regulating tube, and a spreader within the flared end of the regulating tube.

4. A burner including a cylindrical casing having a reduced outlet at one end and having an oil inlet, a steam tube axially within the casing having a steam outlet at one end spaced from the outlet of the casing, a regulating tube adjustable on the steam tube, having one flared end shiftable between the outlet end of said steam tube and the reduced outlet of the casing, means for shifting said regulating tube, and a spreader within the flared end of the regulating tube adjustably connected to and supported by the said steam tube.

5. A burner including a cylindrical casing having a reduced outlet at one end and having an oil inlet, a steam tube axially within the casing having a steam outlet at one end spaced from the outlet of the casing, a regulating tube adjustable on the steam tube, having one flared end shiftable between the outlet end of said steam tube and the reduced outlet of the casing, means for shifting said regulating tube, and a spreader within the flared end of the regulating tube, said steam tube having a bearing at one end and a threaded opening through its opposite end, and a stem to one end of which the spreader is fixed, said stem extending through said bearing and having its opposite end threaded for adjustment through said opening as described.

GEORGE BAUMAN LEAR.